Dec. 19, 1939.  A. H. BERNIER  2,183,534
VEHICLE
Filed April 3, 1937  3 Sheets-Sheet 1
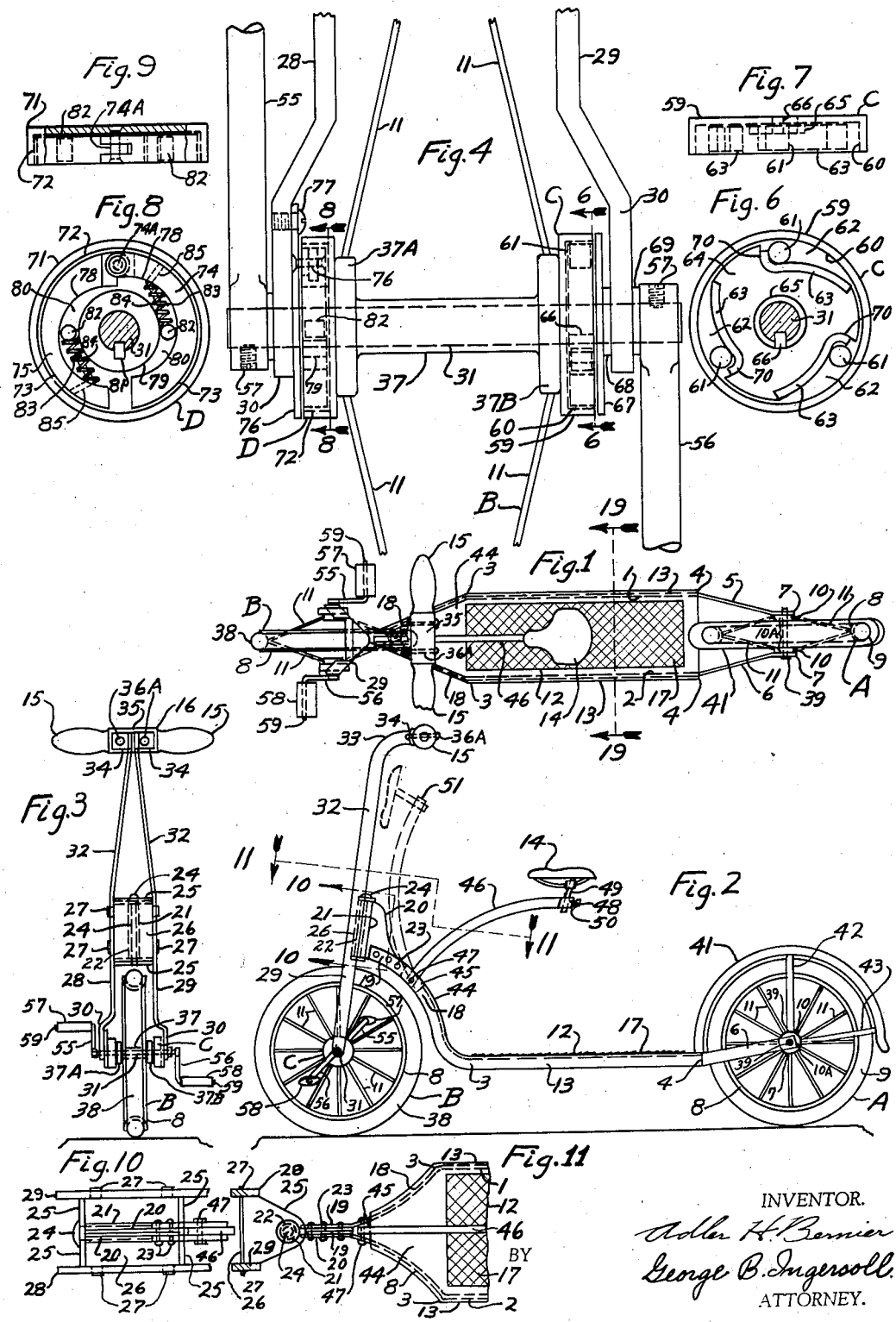
INVENTOR.
Adler H. Bernier
BY George B. Ingersoll
ATTORNEY.

Dec. 19, 1939.     A. H. BERNIER     2,183,534
VEHICLE
Filed April 3, 1937     3 Sheets-Sheet 2
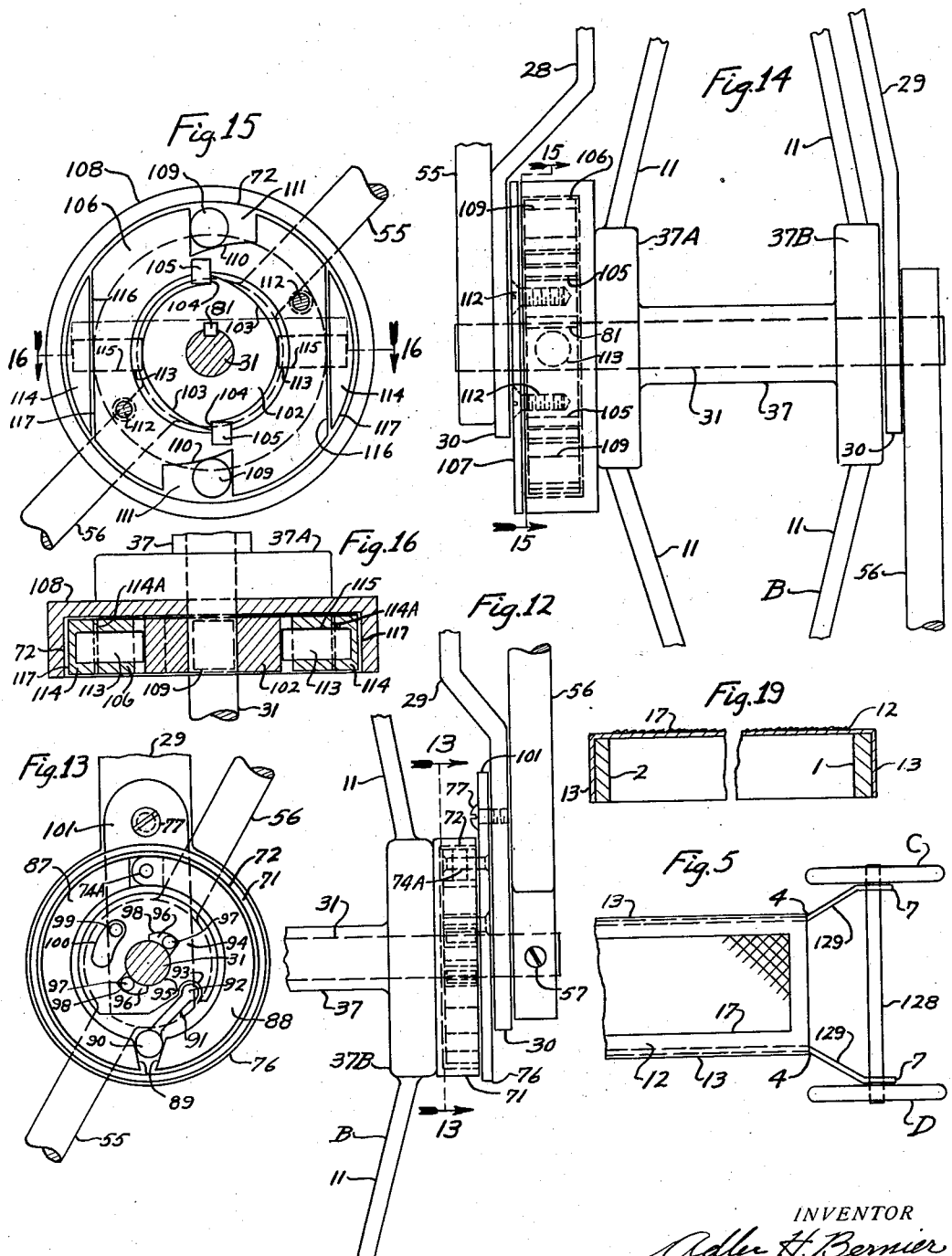
INVENTOR
Adler H. Bernier
BY George B. Ingersoll
ATTORNEY Dec. 19, 1939. A. H. BERNIER 2,183,534
VEHICLE
Filed April 3, 1937 3 Sheets-Sheet 3
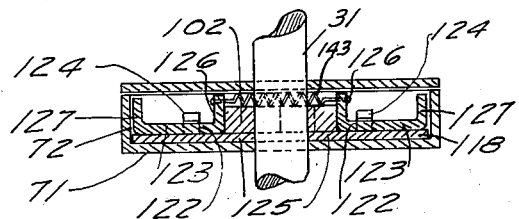
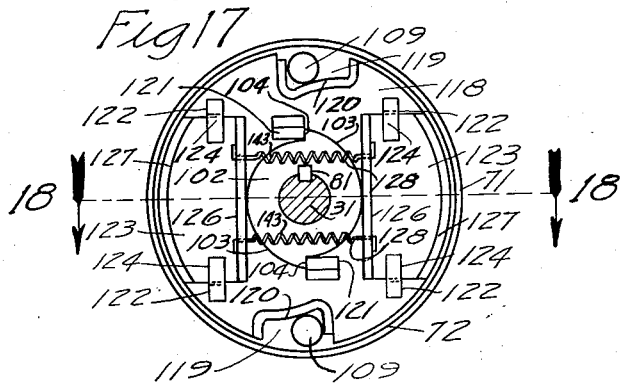
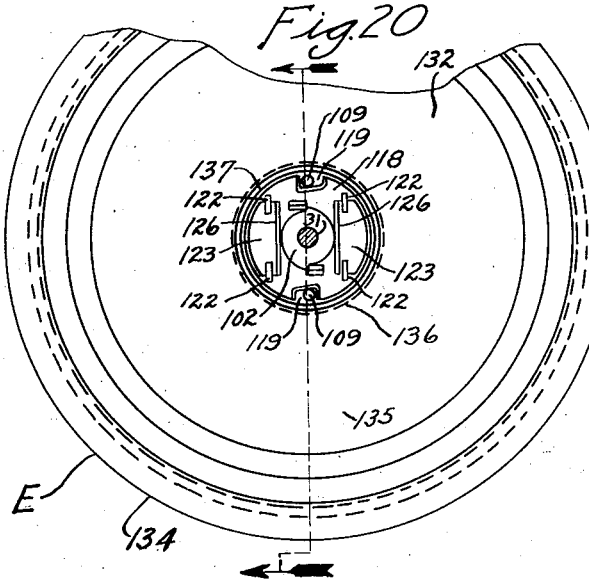
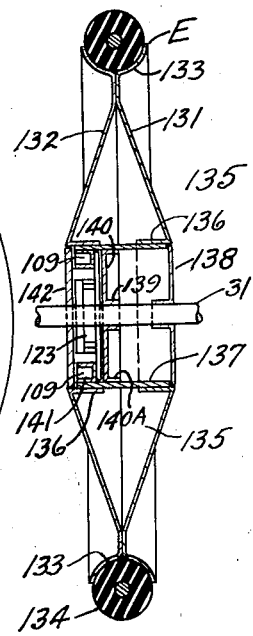
INVENTOR.
Adler H. Bernier
BY George B. Ingersoll
ATTORNEY.

Patented Dec. 19, 1939

2,183,534

UNITED STATES PATENT OFFICE 2,183,534

VEHICLE

Adler H. Bernier, Detroit, Mich.

Application April 3, 1937, Serial No. 134,848

2 Claims. (Cl. 280—87.04)

My invention relates to a vehicle having scooter and bicycle characteristics and the objects of my improvements are, first, to provide a vehicle that can be operated as a bicycle by a rider in a sitting position thereon or as a scooter by a rider in a standing position thereon; second, to provide a scooter bicycle vehicle having exceptional economy of manufacturing; third, to provide a vehicle that will render itself readily constructed as either a two or three wheel vehicle with only a slight change of construction; fourth, to provide a vehicle capable of being operated as a bicycle with an efficient brake mechanism; fifth, to provide a vehicle capable of being operated as a bicycle with an overrunning or free wheeling clutch or coaster mechanism; sixth, to provide a vehicle having a steering mechanism with a pivotally mounted seat mechanism adapted to move to a folded position adjacent said steering mechanism; seventh, to provide a vehicle having a platform for a rider with a seat member adapted to be moved from its normal seating position to a position where it is located away from over said platform; eighth, to provide a vehicle with an overrunning or free wheeling clutch or coaster assembly with a brake assembly constructed therewithin; ninth, to provide a vehicle with a brake assembly operated by reverse operation of an overrunning or clutch coaster mechanism; tenth, to provide a vehicle with a brake mechanism having a pair of brake shoes actuated by a wedge member operatively connected with an overrunning or clutch coaster mechanism; eleventh, to provide a vehicle with a brake mechanism having a pair of brake shoes actuated by a cam member operatively connected with and driving an overrunning or clutch coaster mechanism; twelfth, to provide a vehicle with a platform extended to provide a fender formation at one of its end portions for protecting an operator while supported on the platform from dirt, mud, water, etc.; and thirteenth, to provide a vehicle having a steering wheel assembly with a support platform adjacent and formed to accommodate the shape of the steering wheel assembly to provide fender characteristics for protection of an operator when supported by the platform and to enhance the symmetrical appearance of the vehicle.

I attain these objects by the mechanism illustrated in the accompanying drawings, in which:

Figure 1 is a plan view of the scooter bicycle vehicle; Fig. 2, a side view of the scooter bicycle vehicle disclosed in Fig. 1; Fig. 3, a front view of the scooter bicycle vehicle disclosed in Figs. 1 and 2; Fig. 4, a partial front view of the front or drive wheel together with its driving and support mechanism; Fig. 5, a partial plan view of the scooter bicycle vehicle constructed with a pair of rear wheels; Fig. 6, a sectional view of the scooter bicycle vehicle taken on the line 6—6, Fig. 4 and disclosing a side view of the overrunning clutch or coaster mechanism thereof; Fig. 7, a plan view of the overrunning clutch or coaster mechanism disclosed in Fig. 6; Fig. 8, a sectional view of the scooter bicycle vehicle taken on the line 8—8, Fig. 4, and disclosing a side view of the brake mechanism thereof; Fig. 9, a partial plan and fragmentary view of the brake mechanism disclosed in Fig. 8; Fig. 10, a partial sectional view of the scooter bicycle vehicle taken on the line 10—10, Fig. 2; Fig. 11, a partial sectional view of the scooter bicycle vehicle taken on the line 11—11, Fig. 2; Fig. 12, a partial front view of a front wheel assembly equipped with a brake assembly incorporating a wedge member for expanding a pair of brake shoes; Fig. 13, a sectional view of a brake assembly taken on the line 13—13, Fig. 12; Fig. 14, a partial front view of a front wheel assembly equipped with a brake assembly incorporating a cam means for expanding a pair of brake shoes; Fig. 15, a sectional view of a brake assembly taken on the line 15—15, Fig. 14; Fig. 16, a sectional view of the brake assembly disclosed in Fig. 15 and taken on a line 16—16, Fig. 15; Fig. 17, a vertical sectional view of brake assembly similar to that disclosed in Fig. 15 but with an alternative design of cam operating means; Fig. 18, a sectional view of the brake assembly disclosed in Fig. 17, said sectional view being taken on the line 18—18, Fig. 17; Fig. 19, a sectional view of the foot board or platform and taken on the line 19—19, Fig. 1; Fig. 20, a side view of a front wheel assembly with a brake assembly similar to that of Figs. 17 and 18 and mounted directly in the hub portion of the wheel assembly, said wheel assembly being disclosed without one of its end plates to more fully disclose the brake mechanism; and Fig. 21, a sectional view of the front wheel assembly of Fig. 20 and taken on the line 21—21, Fig. 20.

Similar numerals refer to similar parts throughout the several views.

The vehicle assembly is provided with oppositely disposed side rails or members 1 and 2 which form a frame structure and extend substantially parallel and in horizontal planes between the points 3 and 4 and from the points 4, the side rails 1 and 2 being provided with the portions 5 and 6 which extend inwardly or converge toward one another, the portions 5 and 6 terminating in the portions 7 which extend substantially parallel with one another and are adapted to receive the rear axle or shaft 39 therethrough for rotatably supporting the rear wheel assembly thereon, the portions 5 and 6 extending upwardly to the axis of the rear wheel assembly A in the side view as disclosed in Fig. 2.

The rear wheel assembly A is provided with the hub portion 10 which fits between the portions 7 together with rim portions 8 upon which is mounted the rear pneumatic tire or rubber tire 9, the flanges 10A of the hub portion 10 and the rim portion 8 being connected by the wire spokes 11, the hub portion 10 being provided with suitable bearing means for rotatable support on the shaft or rear axle 39.

The foot board or platform 12 is provided with the side flanges 13 which fit over and adjacent the outer side surfaces of the side rails 1 and 2, the foot board or platform 12 thus being provided with a portion extending substantially in a horizontal plane between the points 3 and 4 and forming the support surface for the rider or operator while operating the vehicle as a scooter and in which operation the operator stands with one foot on the platform 12 and propels the vehicle by pushing on the ground with the other foot, while the hands of the operator grasp the handles 15 of the handle bar 16.

The platform 12 is thus located to provide a space vertically thereabove and fully clear when the seat 14 is moved thereout of, as more fully disclosed hereinafter, to provide a clear and unobstructed passage transversely and across the vehicle to facilitate jumping on and off thereof. The platform 12 is provided with the corrugated or roughened surface 17 to prevent slippage of the operator.

The side rails 1 and 2 are formed to extend upwardly and converge inwardly toward one another at their front portions 18, thus conforming to the shape of the front wheel assembly, and terminate at their front ends in the portions 19 which extend adjacent and engage opposite sides of the folded or adjacent flanges 20 of the sleeve or bushing 21 which is constructed of sheet material with the side walls of the sleeve or bushing 21 extended rearwardly to form the flanges 20 which are fixedly secured between the portions 19 of the side rails 1 and 2 by the rivets 23 or similar fastening means.

The sleeve or bushing 22 forms a bearing for the pin or shaft 24 which is journaled therein, the pin 24 being suitably secured in the flanges 25 of the bracket 26 which is provided with extension portions 27 which extend through suitable openings of fork members 28 and 29 each of which are provided with a bent or offset portion 30 through which extends the shaft or front axle 31 which is supported thereby. The fork members 28 and 29 are constructed with converging portions 32 above the bracket 26, the fork members 28 and 29 being portions of a steering means for the vehicle, the upper end portions of the fork members 28 and 29 being curved rearwardly, as at 33, Fig. 2, and terminating in the flanges 34 which are formed to extend substantially at right angles to the fork members 28 and 29, the flanges 34 being formed with semi-cylindrical surfaces for engaging the cylindrical surface of the hub or central portion 35, of the handle bar 16, which is secured to the flanges 34 by the rivets, bolts or similar fastening members 36A.

The front wheel assembly B is provided with the hub portion 37 having the flanges 37A and 37B for connecting with and supporting wire spokes 11 which in turn are connected with and support an edge or rim portion 8 upon which is mounted the front pneumatic or rubber tire 38.

The hub portion 38 is mounted with suitable bearing means to rotatably support the front wheel assembly B on the shaft or front axle 31.

In a similar way the rear wheel assembly A is rotatably supported on the rear axle 39 which is suitably retained in the portions 7 of the side rails 1 and 2.

The rider of the vehicle is protected from dirt, mud, water, etc., being thrown upon him from the rear wheel assembly A by the rear fender 41 which is constructed with a curved or partial cylindrical cross section to conform to the cross section of the rear tire 9 and is also provided with a curved or cylindrical shape to conform to the diameter of said rear tire 9, the front end portion of the rear fender 41 being suitably connected with the rear end portion of the foot board or platform 12, the rear end of the rear fender 41 extending to a point adjacent the rear side and central portion of the wheel assembly A.

The rear fender 41 is further supported by the brace members 42 and 43 suitably mounted on the rear axle 39 or upon the end portions 7 of the side rails 1 and 2 and respectively connected at their outer portions with central and end portions of the rear fender 41. The rider of the vehicle is further protected from dirt, mud, water, etc., being thrown upon him from the front wheel assembly B by the upturned or fender portion 44, of the foot board or platform 12, which is shaped with converging sides to conform to the shape of the front portions 18 of the side rails 1 and 2, said upturned or fender portion 44 being utilized as and performing the functions of a front fender.

The extreme front end portion of the upturned or fender portion 44, together with the extreme front portions of the converging portions 18 form the triangular shaped space or opening 45 in which the lower end portion of the arm or lever 46 is pivotally mounted on the pin or shaft 47 which extends through the triangular shaped space or opening 45 and is secured in the front portions of the side rails 1 and 2, as by riveting or similar means.

The arm or lever 46 is provided with the boss 48 in which is adjustably mounted the shaft 49 which is locked in adjusted positions therein by the screw 50, the seat 14 being suitably secured to the shaft 49. Thus the arm or lever 46 enables the seat 14 to be pivotally moved or swung from its position, as disclosed by the full lines in Fig. 2, in which it is utilized for supporting the rider when seated, to the position, as indicated by the dotted lines 51, Fig. 2, in which the seat 14 is positioned closely adjacent the converging portions 32 of the fork members 28 and 29, thus permitting the rider or operator to stand on the platform 12 and to propel the vehicle by pushing with a foot from either side thereof, the vertical space above the horizontal surface or portion of the platform being entirely free and clear and unobstructed in any way relative to the presence of any parts of the vehicle in said vertical space.

Also it is to be noted that the arm or lever 46 is constructed with a curved shape or outline, as viewed in Fig. 2, the convex surface of the lever arm 46, in the position, 51 being located adjacent the rear sides of the converging portions 32 of the fork members 28 and 29 and the flanges 20, the concave surface of the lever arm 46 being located to extend substantially tangent to the rear surface of the upturned fender portion 44 of the platform 12 to provide increased clearance space at the rear side of said concave surface and to provide symmetrical appearance of the vehicle as viewed in Fig. 2 and when the seat 14 is thus in its folded position 51.

The pedal levers or arms 55 and 56 are secured to opposite ends of the front axle 31 by set screws 57, the levers or arms 55 and 56 being respectively provided with pedal pads 57 and 58 which are rotatably supported and retained on the bent portions 59 of said levers or arms 55 and 56.

The overrunning clutch or coaster assembly C, Figs. 6 and 7, forms an overrunning or free wheeling driving connection between the front axle 31 and the front wheel assembly B.

The clutch drum or housing 59 is suitably secured to the flange 37B of the hub portion 37 of the front wheel assembly B, as by welding or similar or suitable means and is provided with a bore or cylindrical surface 60 which is adapted for driving engagement with the rollers 61 which are each retained in one of the recesses or spaces 62 formed between the drum 59 and the irregular or cam shaped flanges 63 formed on the disc or flange 64 which is provided with a hub portion 65 keyed to the front axle 31 by the key member 66.

The flanges 63 are formed by displacing or pressing portions of the stock of the disc 64 to extend substantially at right angles to the plane of the main web portion of the disc 64 and for the depth of the bore 60, the open ends of the recesses 62 being closed by the disc or flange 67 which is rotatable on the front axle 31 adjacent the washer 68 which thus spaces the disc 67 from the offset end portion 30 of the form member 29, the washer 69 being utilized to space the lever arm 56 from said offset end portion 30, and if desired the washers 68 and 69 may be fixedly secured to the offset end portion 30 to prevent them from turning. The flanges 63 have their ends 70 formed to provide shoulder portions for engaging and retaining the rollers 61 in one direction and in positions in which they are located at the largest throat or wedge shaped area or cross section of the recesses 62 and in said positions the rollers 61 may freely rotate with the disc 64 and the front axle 31 without engaging the surface of the bore 60 with a driving connection therebetween. Thus when the front axle 31 is rotated in a forward or anti-clockwise direction, as viewed in Fig. 6, by the feet of the operator on the pedal pads 57 and 58, a driving connection is formed by the rollers 61 wedging into the narrower or smaller throat areas or cross sections of the recesses 62. Also when the front axle 31 is rotated in an opposite or clockwise direction, as viewed in Fig. 6, or when the front axle 31 is merely retained, by pressure on the pedal pads 57 and 58, from rotating in a forwardly direction, the rollers 61 will immediately move to the positions adjacent the ends 70 which will permit the front wheel assembly A and the drum 59 to freely rotate and overrun the driving mechanism connected with the pedal pads 57 and 58.

The brake assembly D, Figs. 8 and 9, is provided with the brake drum or housing 71 which is suitably secured to the flange 37A of the hub portion 37 of the front wheel assembly B, as by welding or similar means, and is adapted to rotate therewith, the brake drum 71 being provided with a bore or cylindrical surface 72 which is adapted to be engaged by the surfaces 73 of the brake shoes 74 and 75 which are pivotally supported on the rivet or stud 74A which is fixedly supported in the plate or disc 76 which is fixedly secured to the offset end portion 30 of the form member 28 by the stud or screw 77, the plate or disc 76 substantially forming a closure means for the open side of the bore 72 of the brake drum 71 with only an operating clearance therebetween.

The brake shoes 74 and 75 are each provided with a cam or curved surface 78, the cam surfaces 78 of the brake shoes 74 and 75 being reversed relative to one another, which together with the disc or collar 79 forms wedge shaped spaces or recesses 80 which have their narrower portions or cross sections located respectively at the free end of the brake shoe 74 and at the pivot or supported end of the brake shoe 75, the widest portions or cross sections of the spaces or recesses 80 being located respectively at the pivot or supported end of the brake shoe 74 and at the free end of the brake shoe 75. The disc or collar 79 is fixedly secured to the front axle 31 and is adapted to rotate therewith within the brake drum 71, the key member 81 forming a driving connection between the disc or collar 79 and the front axle 31.

The rollers 82 are maintained in positions of engagement with the disc or collar 79 and the cam surfaces 78 by the resilient members or springs 83 which extend within the recesses 80 and are retained by telescoping over the pins 84 which are bent to form the portions 85 which extend into and are suitably secured, as by a press fit or similar means, in the brake shoes 74 and 75, the springs 83 each having a sufficient tension and length to extend, without expansion or stretching, to the positions, as disclosed in Fig. 8, and in which positions the springs 83 engage and position the rollers 82 in engagement with the disc 79 and the cam surfaces 78, at points substantially midway of or at the main portion or cross section of the recesses 80.

It is now to be noted that when the lever arms 55 and 56 are operated to drive the front wheel assembly B in a forward direction, as viewed in Figs. 4 and 6, the drum 71 together with the disc 79 will rotate in an anti-clockwise direction, as viewed in Fig. 8, with the result that the rollers 82 will be caused to rotate in clockwise directions, as viewed in Fig. 8, with the further result that the rollers 82 will tend to move into the wider portions of the recesses 80, thus allowing the brake shoes 74 and 75 to be positioned out of effective engagement with the bore 72 of the brake drum 71, until the lever arms 55 and 56 are moved by the operator in an opposite direction which will result in the drum 71 and disc 79 rotating in a clockwise direction, as viewed in Fig. 8, which will rotate the rollers in anti-clockwise directions, as viewed in Fig. 8, with the result that the rollers 82 will be moved into the narrower portions of the recesses 80 and force the surfaces 73 of the brake shoes 74 and 75 to effectively engage the bore 72 of the brake drum and develop braking characteristics for the vehicle.

In Figs. 12 and 13, the brake shoes 87 and 88 are pivotally supported on a pin or rivet 74A in a manner similar to that disclosed in Fig. 8, the free ends of the brake shoes 87 and 88 each being provided with an angular or cam surface 89, said angular or cam surfaces 89 being oppositely disposed to form a wedge shaped recess therebetween, said angular or cam surfaces 89 being adapted to be engaged by the cylindrical end portion or boss 90 of the wedge or link member 91 which is further provided with a cylindrical end portion or boss 92 which is pivotally retained in the notch or semi-bore 93 of the collar member 94 which is provided with a bore 95 rotatably engaging the front axle 31. The collar member 94 is provided with oppositely disposed notches which, together with the front axle 31, form recesses or chambers 96 in which are retained the rollers 97 which are retained, by their engagement with the front axle 31, in the wide portions of the recesses 96 at one of their ends, the recesses 96 being provided with a narrower section or cross section at their opposite ends, one side of each of said narrow sections being defined by cam or curved surfaces 98. The collar member 94 is further provided with a slot 100, radially disposed about the axis of the front axle 31, and adapted to be engaged by the pin or stud 99 which is fixedly supported in a plate or disc 76 fixedly secured to the offset end portion 30 of the fork member 29 by the stud or screw 77, said pin or stud 99 acting as a stop member to limit the movement of said collar member 94, the plate or disc 76 being provided with an arm or extension portion 101 through which the pin or stud 99 extends.

Thus when the lever or arms 56 and 55 are rotated by the operator in a clockwise direction, as viewed in Fig. 13, to drive the vehicle in a forward direction, the rotation of the front axle 31, by its engagement with the rollers 97, will move and retain the rollers 97 in overrunning or free wheeling positions in the wide portions of the recesses 96 without driving the collar 94 and when the levers or arms 55 and 56 are rotated in an opposite or anti-clockwise direction, as viewed in Fig. 13, the rotation of the front axle 31, by its engagement with the rollers 97, will move the rollers 97 into the narrower portions of and into wedging engagement with the cam surfaces 98 of the recesses 96 with the result that the collar member 94 will be driven, by the front axle 31 and the rollers 97, to rotate in a clockwise direction to move the wedge or link member 91 which is provided with a cylindrical shaped end portion adapted to engage and spread the angular surfaces 89 and expand and move the brake shoes 87 and 88 to effectively engage the bore 72 of the brake drum 71 to develop braking characteristics.

In the brake assembly disclosed in Figs. 14, 15 and 16, the collar member 102 is secured to the front axle 31 by a key member 81 and is provided with oppositely disposed cam or curved portions or similar surfaces 103 extending tangent to the hub portion of the collar member 102 and each terminating at one of its ends, at a shoulder portion 104, the shoulder portions 104 being adapted to engage the stop or key members 105 which are fixedly supported in and adapted to drive the collar member 106 which in turn is fixedly supported on the disc 107 by the screws 112 which extend therethrough and into said collar member 106, the disc 107 being rotatably supported on the front axle 31.

The collar member 106 is adapted to drive the drum 108 by means of the rollers 109 when the levers or arms 55 and 56 are rotated in an anti-clockwise direction, as viewed in Fig. 15, the rollers 109 then being wedged between the bore 72 of the drum 108 and the cam or curved surfaces 110 at the bottoms of the wedge shaped recesses 111 of the collar member 106, the rollers 109 permitting overrunning or free wheeling operation between the collar member 106 and the drum 108 when the rollers 109 occupy the positions at the large ends of the wedge shaped recesses 111, as disclosed in Fig. 15, due to the driven rotation of the collar member 102 in an anti-clockwise direction as viewed in Fig. 15 by the collar member 106 and the front axle 31 together with the lever or arms 55 and 56.

Also when the collar member 106 is thus rotated in a clockwise direction the cam or curved surfaces 103 engage and actuate the pins or shafts 113 outwardly which in turn moves the brake shoes 114 outwardly to engage the bore 72 of the drum 108 to develop braking characteristics. The pins or shafts 113 are slidably mounted in the bores 115 of the collar or member 106 and extend within the bores in the brake shoes 114 and are suitably secured therein as by a press fit. The collar member 106 is provided with oppositely disposed flatted sides 116 which form recesses 117 between the collar member 106 and drum 108 for containing the brake shoes 114. Thus the brake assembly disclosed in Figs. 14, 15 and 16 further incorporate therein a free wheeling and driving mechanism.

In the brake assembly disclosed in Figs. 17 and 18 which also incorporates a free wheeling and driving mechanism, the intermediate driving member, disc or collar member 118 is constructed as a stamping from sheet material and portions of which are displaced to form the wedge shaped recesses 119 which are flanged and are provided with cam or curved surfaces 120 at their bottoms, the wedge shaped recesses 119 containing rollers 109 for engaging the bore 72 of the brake drum 71. Also the stop portions or bosses 121 are formed by displacing portions of the material of the collar member 118 for engaging the shoulder portions 104 of the collar member 102. Also the collar member 118 is provided with the clips or brackets 122 which are provided with offset portions 124 to permit the brake shoes 123 to be slidably retained between the offset portions 124 and the main web or flange portion 125 of the collar member 118, the brake shoes 123 being provided with flange portions 126 which are adapted to be engaged by the cam or curved surfaces 103 of the collar member 102 to actuate the brake shoes 123 outwardly to cause its flange portions 127 to engage the bore 72 of the brake drum 71 to develop braking characteristics. A pair of springs or resilient members 143 are secured to the flange portions 126 of the brake shoes 123 to maintain the flange portions 126 in engagement with the cam or curved surfaces 103 of the collar member 106.

Fig. 5 discloses my vehicle assembly adapted for use as a three wheel vehicle and in which the portions 5, as disclosed in Figs. 1 and 2 are bent outwardly as at 129 to position the portions 7 in spaced positions for supporting a rear axle 128 and for further spacing and positioning the pair of rear wheel assemblies C and D which are rotatably mounted and supported at the ends of the rear axle 128, the reversing of the members 1 and 2 thus providing a frame structure for a three wheel vehicle.

Figs. 20 and 21 disclose a front wheel assembly E of disc construction and provided with discs 131 and 132, suitably secured together as by welding or similar means, and formed to provide the rim or felloe structure 133 in which is mounted a tire 134, the discs 131 and 132 being further formed to provide a central portion 135, having a hollow triangular cross section, the side walls thereof being provided with inwardly extending flanges forming oppositely disposed cylindrical portions 136 in which extends and is mounted a cylindrical hub 137, one end of which is closed by a disc 138 suitably secured to the cylindrical hub 137 and/or the disc 131, as by welding, said disc 138 being provided with a hub portion 139 through which extends and is secured thereto, a front axle or shaft 31.

Also a disc 140 is provided with a hub portion 139 similarly secured to the front axle or shaft 31, the disc 140 being further provided with a flange 140A for securement to the cylindrical hub 137, the disc 140 being positioned inwardly from one end of the cylindrical hub 137 to provide a chamber 141 in which is assembled a driving and brake mechanism similar to that disclosed in Figs. 17 and 18, the cylindrical hub 137 having the functions of a brake drum member similar to the brake drum 71 of Figs. 17 and 18, the outer end of the chamber 141 being closed by a disc 142 which may be suitably secured to the cylindrical hub 137 and/or the disc 132.

In operation, the operator grasps the handles 15 and while standing on the board or platform 12 with one foot, propels the vehicle by pushing on the ground with the other foot, the handles 15 together with the fork members 28 and 29 enabling the operator to control the movement of the vehicle by the steering operation of the front wheel assembly B. With the operator utilizing the vehicle as a scooter in the above described manner, the seat 14 will be positioned as indicated at 51, Fig. 2, thus rendering the vertical space above the horizontal surface of the platform entirely free and clear and unobstructed to permit the operator to jump on or off the platform from either side without possibility of interference with projecting portions of the vehicle.

When it is desired to utilize the vehicle as a bicycle, the seat 14 is positioned as indicated by the full lines, Fig. 2, and above the platform 12, the operator being supported on the seat 14 and with his or her feet on the pedal pads 57 and 58, the lever or arms 55 and 56 are rotated to drive the front wheel assembly B and propel the vehicle in a forward direction.

The front axle 31 is adapted to drive the front wheel assembly B through the rollers 61 or 109, being forced into wedging engagement with the bore 72 of the brake drums.

When the operator stops pedaling, the driving mechanism is then free wheeling in its operation, the rollers 61 or 109 operating in a free wheeling or overrunning manner without driving the brake drums and if the lever arms are pressed backward slightly, the brake shoes 74 and 75 will be expanded by means of the rollers 82 engaging the narrower portions of the recesses 80 to engage the brake drum 71, Fig. 8. In a similar manner, the reverse rotation of the levers or arms 55 and 56 will expand brake shoes 87 and 88 by means of the wedge member 91, Fig. 13, the rollers 97 in this construction providing the means for driving the collar member 94 to actuate the wedge member 91 as well as providing free wheeling or overrunning coaster characteristics.

In a similar manner, the brake shoes 114 are actuated outwardly, to engage the brake drum 108, Fig. 15, to develop braking characteristics, by the pins 113 which engage the cam surfaces 103 of the collar member 102 which is driven by the front axle 31, the collar member 102 driving the collar member 106 through the stop members 105, thus driving the drum 108 and front wheel assembly B through the roller members 109 which operate with a free wheeling or overrunning coaster operation when the levers or arms 55 and 56 are held stationary.

The construction of the combined brake and driving or clutch mechanism disclosed in Figs. 17 and 18 is similar in operation to the above described brake and clutch mechanisms and is provided with its parts constructed principally of stampings from sheet material.

When it is desired to utilize the vehicle as a bicycle operated unit but with additional wheel supports, the side rails 1 and 2 may be formed with its rear portions bent outwardly, as disclosed in Fig. 5, to accommodate a pair of wheel assemblies C and D to provide a balanced support in equilibrium and substantially forming a tricycle.

I claim:

1. In a vehicle, the combination of a front wheel assembly, a rear wheel assembly, a steering means connected with said front wheel assembly, a platform supported by said rear wheel assembly and said steering means and provided with a portion extending substantially in a horizontal plane together with a front end portion extending upwardly adjacent and conforming to the shape of said front wheel assembly, a lever arm pivotally supported adjacent the end of said front end portion of said platform, said lever arm having a curved shape, and a seat member supported by said lever arm, said lever arm and said seat member being adapted to be pivotally moved adjacent said steering means, said lever arm having a concave surface extending substantially tangent to the rear surface of said front end portion of said platform when said lever arm and said seat member are adjacent said steering means to provide increased clearance space above said portion of said platform extending substantially in said horizontal plane together with symmetrical appearance of the vehicle.

2. A vehicle comprising front and rear wheels, a substantially horizontal platform between said wheels and below a plane containing the axes thereof, a steering frame arising from the axle of said front wheel, a second frame connecting said rear wheel and said steering frame, said steering frame at its upper end curving rearwardly of the vehicle and having handle bars projecting laterally therefrom, a seat supporting member curved in the direction of said steering frame hingedly connected to said second frame extending rearwardly of the front wheel and freely suspended above said platform, and a seat carried by said seat supporting member, said member with said seat being swingable through a vertical arc to an over-center position within the curvature of said steering frame, said seat coming to rest in said over-center position below the curved portion of said steering frame.

ADLER H. BERNIER.